United States Patent
Maurice et al.

(10) Patent No.: US 11,079,615 B2
(45) Date of Patent: Aug. 3, 2021

(54) METHOD FOR MONITORING A SPECTACLE LENS

(71) Applicant: Essilor International, Charenton-le-Pont (FR)

(72) Inventors: Sebastien Maurice, Charenton-le-Pont (FR); Daniel Ferreira, Charenton-le-Pont (FR); Christophe Hubert, Charenton-le-Pont (FR); Stephane Auffray, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 59 days.

(21) Appl. No.: 16/330,567

(22) PCT Filed: Sep. 7, 2017

(86) PCT No.: PCT/EP2017/072421
§ 371 (c)(1),
(2) Date: Mar. 5, 2019

(87) PCT Pub. No.: WO2018/046579
PCT Pub. Date: Mar. 15, 2018

(65) Prior Publication Data
US 2020/0225512 A1     Jul. 16, 2020

(30) Foreign Application Priority Data
Sep. 7, 2016 (EP) .................................... 16306122

(51) Int. Cl.
*G02C 13/00* (2006.01)
*B29D 11/00* (2006.01)
*G02C 7/02* (2006.01)

(52) U.S. Cl.
CPC ...... *G02C 13/001* (2013.01); *B29D 11/00317* (2013.01); *G02C 7/021* (2013.01)

(58) Field of Classification Search
CPC .... G02C 13/001; G02C 7/021; G02C 13/003; B29D 11/00317; B29D 11/00951;
(Continued)

(56) References Cited

U.S. PATENT DOCUMENTS 10,496,882 B2 * 12/2019 Kingsbury .............. G06F 21/32
2004/0095645 A1    5/2004 Pellicori et al.
(Continued)

FOREIGN PATENT DOCUMENTS

FR        2 879 313 A1    6/2006
WO    WO 2015/004208 A1    1/2015

OTHER PUBLICATIONS

International Search Report dated Nov. 30, 2017 in PCT/EP2017/072421 filed on Sep. 7, 2017.

*Primary Examiner* — Tuyen Tra
(74) *Attorney, Agent, or Firm* — Oblon, McClelland, Maier & Neustadt, L.L.P.

(57) ABSTRACT

On a first aspect, the spectacle lens is selected as including a transparent support in which is coded an identifier readable by an external reading tool for retrieving the identifier. A distant server is contacted using the identifier and data related to the spectacle lens is so gathered. On a second aspect, data related to the spectacle lens is provided to a predetermined database. Upon receiving a request issued from a requester, the database is accessed and at least some of the data is retrieved, the request including at least part of the identifier, and the retrieved data is sent to the requester.

18 Claims, 4 Drawing Sheets

(58) Field of Classification Search
CPC ........... G06Q 10/0832; G06Q 30/0621; G06Q 10/0833; G06Q 10/0875; G06Q 30/0625; G06Q 30/0631; G06Q 30/0641
See application file for complete search history.

(56) References Cited

U.S. PATENT DOCUMENTS

| | | |
|---|---|---|
| 2007/0274626 A1 | 11/2007 | Sabeta |
| 2007/0276858 A1 | 11/2007 | Cushman, II et al. |
| 2009/0198686 A1 | 8/2009 | Cushman, II et al. |
| 2009/0302122 A1 | 12/2009 | Begon |
| 2012/0314186 A1 | 12/2012 | Levraud et al. |
| 2014/0300856 A1 | 10/2014 | Dangelmaier et al. |
| 2014/0340631 A1 | 11/2014 | Pugh |
| 2016/0116762 A1 | 4/2016 | Dangelmaier et al. |
| 2016/0161760 A1 | 6/2016 | Godot |

\* cited by examiner

METHOD FOR MONITORING A SPECTACLE LENS

FIELD OF THE INVENTION

The invention relates to spectacle lenses.

BACKGROUND ART

The lifetime of spectacle lenses includes different portions, for instance when it is a semi-finished lens, then a finished lens, then a trimmed lens and then when it is mounted in the frame of a pair of spectacles.

SUMMARY OF THE INVENTION

The invention is directed to the monitoring of a spectacle lens during at least one portion of its lifetime in a way that is accurate and reliable while being simple and convenient.

The invention accordingly provides, on a first aspect, a method for monitoring a spectacle lens, including the steps of:
  a) selecting said spectacle lens as including a transparent support in which is coded an identifier readable by an external reading tool for retrieving said identifier;
  b) reading said support using the external reading tool and retrieving said identifier;
  c) contacting a distant server using the identifier; and
  gathering from the distant server data related to the spectacle lens.

With the method according to invention, the risk of error is minimized and data related to the spectacle lens can be retrieved without difficulty at numerous moments so that the monitoring can be accurate and reliable.

The invention is based on the finding that it is possible to include or incorporate in a spectacle lens such a support (in which is coded an identifier) which is together transparent (invisible or semi-visible) and readable by an external tool for retrieving the identifier.

Because the support is transparent (invisible or semi-visible), the support does not disturb the wearer of the spectacles in which is included this lens. Because the support is readable by an external tool, the reading of the support is accurate and reliable while being simple and convenient; and consequently the monitoring based on the data related to the spectacle lens is accurate and reliable while being simple and efficient.

By transparent is meant that the support does not impact significatively the local diffusion of the lens. For example a haze value in an area comprising the support is increase by less than 0.1, preferably less than 0.05 or even 0.02 when compared to an area of the lens that does not comprise the support, when the measured area is about 50 or 55 times greater than the support, or according to alternative equivalent measurement of the haze value. Further, by transparent is also meant that the support does not reduce the transmission value by more than 20% of the transmission value of a part of the lens without said support.

The invention also provides, according to a second aspect, a method for monitoring a spectacle lens, including the steps of:
  a) allocating to said spectacle lens an identifier that is unique to said spectacle lens;
  b) incorporating into said spectacle lens a transparent support in which is coded said identifier so that said support is readable by an external reading tool for retrieving said identifier;
  c) providing data related to said spectacle lens to a predetermined database, before or after step b);
  d) upon receiving a request issued from a requester, accessing the data base and retrieving at least some of said data, the request including at least part of the identifier;
  e) sending the retrieved data to the requester; and
  f) optionally, either before step b) or after step e), receiving new data related to said spectacle lens and adding said data into the data base.

It is noted that the first aspect of the invention (disclosed above) relates to the side where the spectacle lens is handled while the second aspect (just disclosed) is directed to the side where data related to the spectacle lens is handled.

According to advantageous features:
  the spectacle lens is already in the form of a trimmed lens having a contour in accordance with the shape of the frame in which the spectacle lens is to be mounted and the support is incorporated in a location of the spectacle lens selected to still belong to the trimmed lens;
  the monitoring is performed at predetermined portions of the lifetime of said spectacle lens, including at least one mounted-in-a-frame portion in which the spectacle lens is mounted in a frame;
  said support is a reflective-transmissive pattern formed on a front face of the spectacle lens, visible on the side of the front face;
  said support is a reflective-transmissive pattern formed on a front face of the spectacle lens, visible on the side of the front face; and said step of reading said support with said external reading tool for retrieving said identifier is carried out by taking a photograph or video of said pattern and by analyzing said photograph or video or having it analyzed or sent to a server for analyzing;
  said support is a RFID device;
  said support is a RFID device; and said step of reading said support with said external reading tool for retrieving said identifier is carried out by receiving said identifier from said RFID device through a RF reader, such as one using a NFC protocol;
  in said step of reading said support with a reading tool for retrieving said identifier, said reading tool is a consumer product configured to be connected to an external network such as Internet;
  the consumer product is a portable or mobile device, such as a smartphone, touchpad or tablet computer, PDA or the like, configured to connect directly or indirectly to the Internet by use of wireless communication means;
  said received request issued from a requester includes a variable related to the nature of the requester, and the data sent back toward the requester depends both on the identifier and on the nature of the requester;
  the monitoring is performed at predetermined portions of the lifetime of said spectacle lens, including at least one mounted-in-a-frame portion in which the spectacle lens is mounted in a frame; and said step of accessing the data base is performed using a computer system which includes an entry point, said entry point including a monitoring variable interactive managing routine for updating a monitoring variable having a current value representative of a current one of said portions of the lifetime of said spectacle glass, and said step of accessing the data base includes accessing said entry point and carrying out said monitoring variable interactive managing routine;
  the monitoring is performed at predetermined portions of the lifetime of said spectacle lens, including at least one mounted-in-a-frame portion in which the spectacle lens is mounted in a frame; and said predetermined portions of the lifetime of said spectacle lens include at least one not-yet-mounted-in-a-frame portion in which the spectacles lens is not yet mounted in a frame;

said computer system includes for said at least one not-yet-mounted-in-a-frame portion a data base section that contains data representative of physical parameters in relation to manufacturing of said spectacle lens;

the monitoring is performed at predetermined portions of the lifetime of said spectacle lens, including at least one mounted-in-a-frame portion in which the spectacle lens is mounted in a frame; and said computer system includes for said at least one mounted-in-a-frame portion a data base section that contains data representative of optical properties of said spectacle lens;

said optical properties include at least one of a spherical power and a cylindrical power;

said data base section that contains data representative of optical properties of said spectacle lens also contains data representative of physical parameters in relation to servicing of said spectacle;

said data base section that contains data representative of optical properties of said spectacle lens also contains information representative of optical properties of the pair of spectacles in which is mounted said spectacle lens; and/or said data base section that contains data representative of optical properties of said spectacle lens also contains data representative of optical properties of the other spectacle lens in the pair of spectacles in which is mounted said spectacle lens.

BRIEF DESCRIPTION OF THE DRAWINGS

The description of the invention continues now with a detailed description of preferred embodiments given hereinafter by way of non-limiting illustration and with reference to the appended drawings. In the drawings.

DETAILED DESCRIPTION OF PREFERRED EMBODIMENTS

Figure 1:
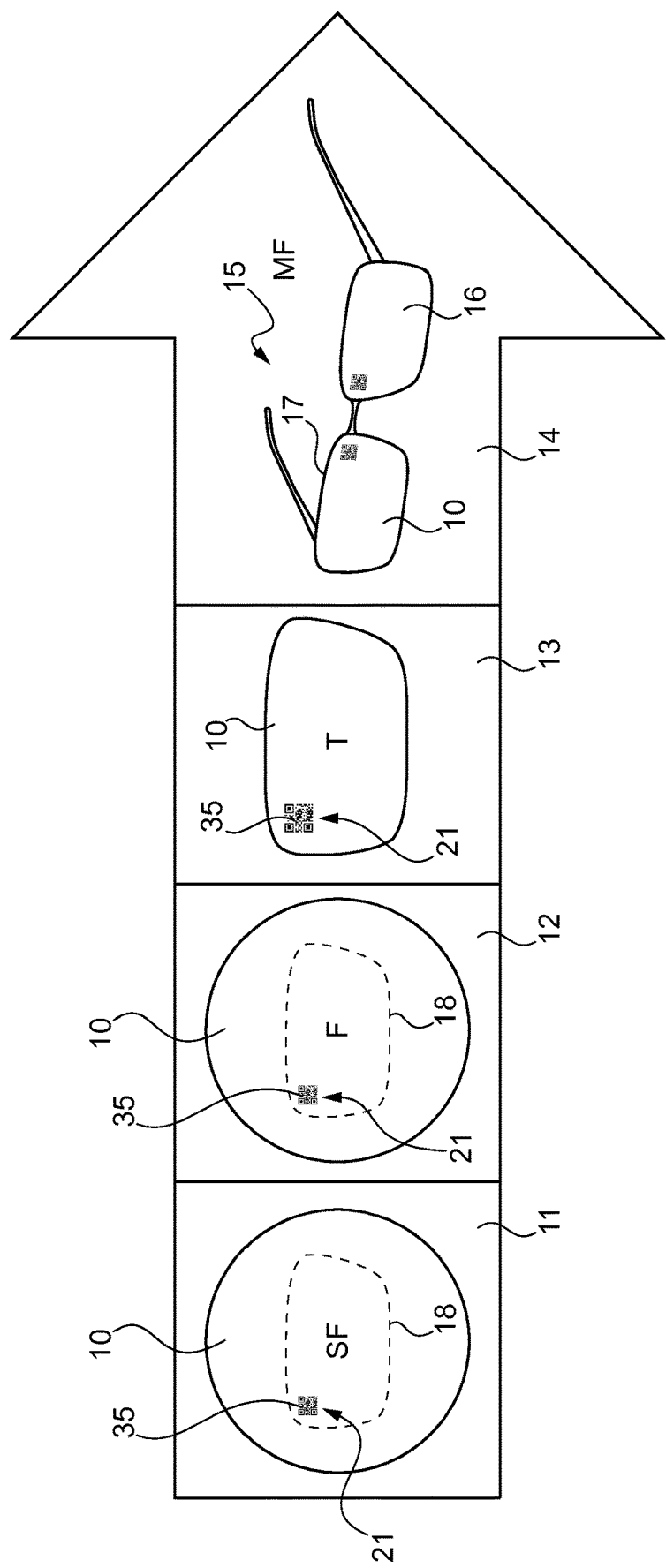
FIG. 1 is a schematic representation of the lifetime of a spectacle lens.

FIG. 1 illustrates schematically the lifetime of a spectacle lens 10, in chronologic order from left to right, as shown by the arrow at the right.

In a first portion 11 of the lifetime, the spectacle lens 10 is in the form of a semi-finished lens (SF) having a circular contour. One of the main faces, for instance the front face, is finished and the other main face, in this instance the rear face, is unfinished.

Alternatively, the semi-finished lens has no finished main face and/or has a contour which is not circular.

In the following portion 12 of the lifetime, the spectacle lens is in the form of a finished lens (F). Both main faces of the spectacle lens 10 are finished. Between portion 11 and portion 12, the rear face of the lens has been machined so as to have a shape giving to the spectacle lens 10 the desired optical properties such as spherical power, cylindrical power and/or addition. In portion 12, the spectacle lens 10 has the same circular contour as in portion 11.

In the following portion 13 of the lifetime, the spectacle lens 10 is in the form of a trimmed lens (T) having a contour in accordance with the shape of the frame in which the spectacle lens 10 is to be mounted. Between portion 12 and portion 13, the edge of the lens has been trimmed for instance by a grinding station.

In the following portion 14 of the lifetime, the spectacle lens 10 is in the same form as in portion 13 but is mounted in a frame (MF) of a pair of spectacles 15.

The other spectacle lens 16 mounted in the frame 17 of the pair of spectacles 15 has a lifetime similar to the lifetime of the spectacle lens 10.

Generally speaking, the description given below in relation to spectacle lens 10 applies also to spectacle lens 16.

An identifier 20 (here an alphanumeric sequence, see FIG. 2) that is unique to spectacle lens 10 has been allocated to spectacle lens 10.

The identifier 20 is included in a support 21 incorporated in the spectacle lens 10. The support 21 is readable by an external reading tool for retrieving the identifier 20. Here, the external tool is a smartphone 22.

A computer system 23 remotely accessible by the smartphone 22 includes an entry point 24, a data base 25, a data base manager 26 and a navigation manager 27.

The entry point 24 includes an interactive managing routine for updating a monitoring variable 28 having a current value representative of a current one of the portions 11 to 14 of the lifetime of the spectacle 10.

The data base 25 has a plurality of sections 30 to 33 each configured for containing data representative of current physical parameters of spectacle lens 10. The data base 25 may also contain other parameters and/or data, for instance the commercial name of the spectacle lens 10 and/or the name of the owner of the spectacle lens 10.

It is understood that sections 30 to 33 does not relate to the physical arrangement of the data in the database 25 but to the capacity of the database 25 and the database manager 26 to retrieve and arrange data according to sections 30 to 33.

Section 30 is specific to portion 11 of the lifetime of spectacle lens 10. Section 31 is specific to portion 12. Section 32 is specific to portion 13. Section 33 is specific to portion 14.

For monitoring the spectacle lens 10 during portions 11 to 14 of its lifetime, the following steps are carried out at at least one moment of the lifetime.

On the side of the person handling spectacle lens 10, the support 21 is read with the smartphone 22 for retrieving the identifier 20, the entry point 24 is accessed with the identifier 20, an interactive exchange is conducted with the interactive managing routine of the entry point 24 which accordingly updates if needed the current value of the monitoring variable 28, and the data base 25 can then be accessed by this person through the data base manager 26 which selectively provides access to at least one of the sections 30 to 33 according to the current value of the monitoring variable 28.

On the side of the computer system 23, the same steps are viewed as follows: a request for access including the identifier 20 retrieved from the support 21 with the smartphone 22 is received by the entry point 24, in response the interactive managing routine of the entry point 24 is carried out for updating the monitoring variable 28 if needed, then access is selectively provided by the data base manager 26 to at least one of the sections 30 to 33 according to the current value of the monitoring variable 28.

The received request issued from a requester may include a variable related to the nature of the requester, and the data sent back toward the requester may depend both on the identifier and on the nature of the requester.

Here, the data base section 33 included in the data base 25 for the mounted-in-a-frame portion 14 of the lifetime of the spectacle lens 10 contains data representative of optical properties of spectacle lens 10.

These optical properties are at least one of a spherical power and a cylindrical power.

The data base section 33 also contains data representative of physical parameters in relation to servicing of the spectacle lens 10, information representative of optical properties of the pair of spectacles 15 in which is mounted the spectacle lens 10, and/or data representative of optical properties of the other spectacle lens 16 in the pair of spectacles 15.

The method of monitoring spectacle lens 10 just described is very useful to the different actors around the spectacle lens 10.

The owner of the pair of spectacles 15 can very easily and conveniently benefits of the data stored in the data base 25.

The optical properties of the spectacle lens can be useful to the user or to an Eye Care Professional (ECP) for retrieving the current prescription and/or other personal features characteristic of the user, without needing a specific search or enquiry or even any optometric measurement. For example, the ECP or the wearer can easily access to the current prescription, a possible progressive design already used for defining the optical surface of the current lens, or even mounting parameters, used for mounting the lenses on a frame, such inter-pupillar distance or pantoscopic angle.

This is the same for the optical properties of the pair of spectacles 15 and for the optical properties of the other spectacle lens 16. For instance if spectacle lens 10 is so damaged that reading support 21 is no longer possible, but spectacle lens 16 is still available and its support 21 still readable, data in relation to spectacle lens 10 can be so gathered.

Such data can be entered in the data base 25 very easily and conveniently by the manufacturer of the spectacle lens, by the optician having assembled the pair of spectacles 15 or by the owner of the pair of spectacles 15.

The data representative of physical parameters in relation to servicing of the spectacle lens 10 can be very useful to the optician and to the user for optimising the maintenance of the spectacle lens 10.

Such data can be entered in the data base 25 by the manufacturer of the spectacle lens at the appropriate time that can be easily determined by the current value of the monitoring variable 28.

Here, the data base sections 30 to 32 included in the data base 25 for the not-yet-mounted-in-a-frame portions 11 to 13 of the lifetime of the spectacle lens 10 contain data representative of physical parameters in relation to manufacturing of the spectacle lens 10, for instance physical parameters in relation to the step of machining the unfinished face carried out between portions 11 and 12 or in relation to the edge trimming step carried out between portions 12 and 13.

The data base sections 30 to 33 can also be useful for tracking and traceability in plants or for quality analysis in case of damage during use or other traceability application.

Certain data related to spectacle lens 10 is initially provided in database 25, before or after having incorporated support 21 into spectacle lens 10.

Further data related to spectacle lens 10 is optionally received and added in the database 25 at different moments, for instance before the step of incorporating support 21 into spectacle lens 10 or after having sent data retrieved from database 25 to a requester having issued a request including at least part of identifier 20.

As is apparent on FIG. 1, the step of incorporating the support 21 into the spectacle lens 10 is carried out at a time at which the spectacle lens is not mounted in a frame such as frame 17; and the support 21 is incorporated in a location of the spectacle lens 10 selected to still belong to the spectacle lens 10 when the spectacle lens 10 is mounted in a frame such as frame 17.

It should be noted in this respect that in FIG. 1, the dashed line 18 in portions 11 and 12 shows the expected contour of the spectacle lens 10 after edging or trimming, that is from portion 13 on. Support 21 is within dashed line 18.

Figure 2:
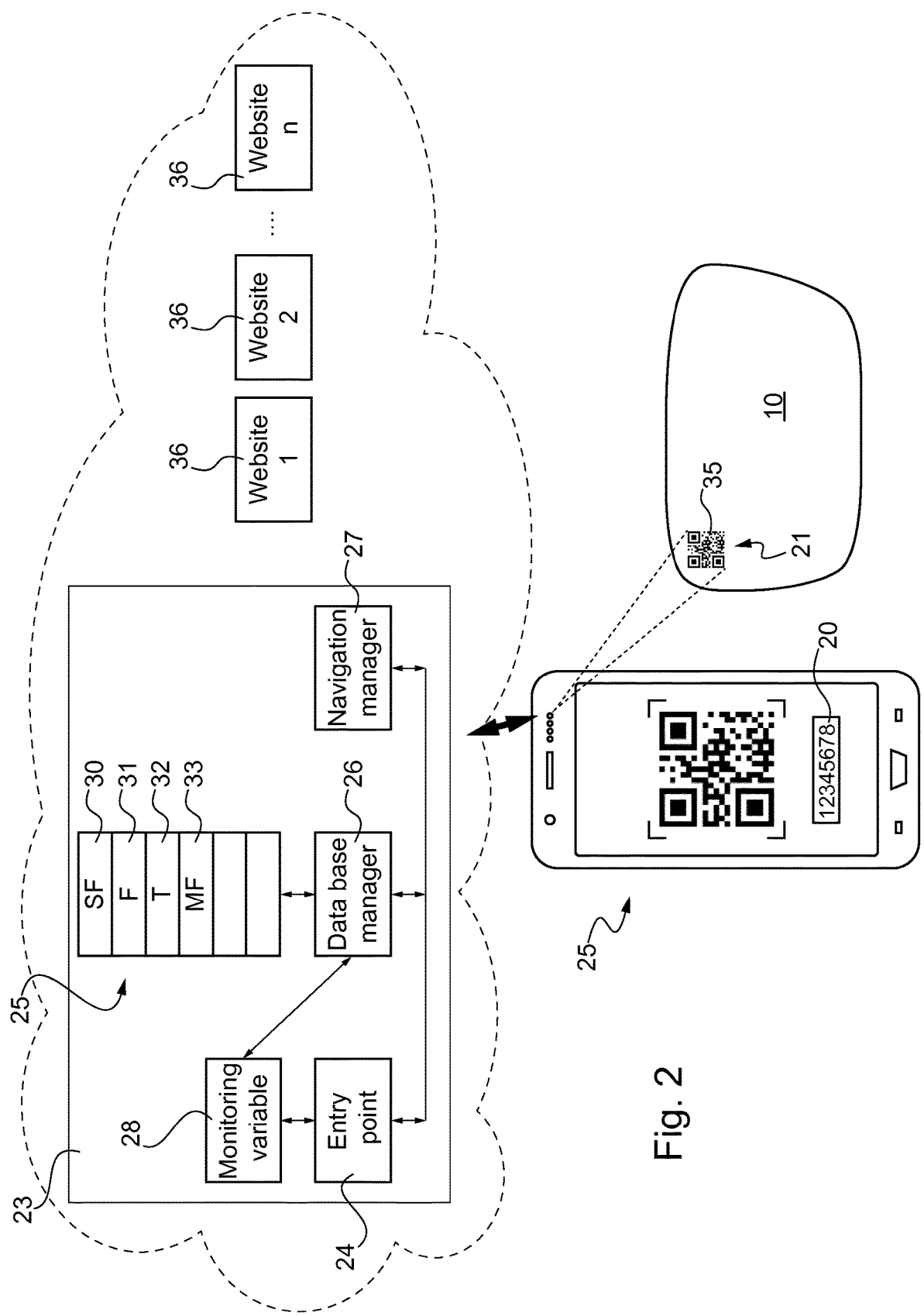
FIG. 2 is schematic representation of a spectacle lens, a smartphone and a computer system with which the method according to the invention can be carried out.
Figure 3:
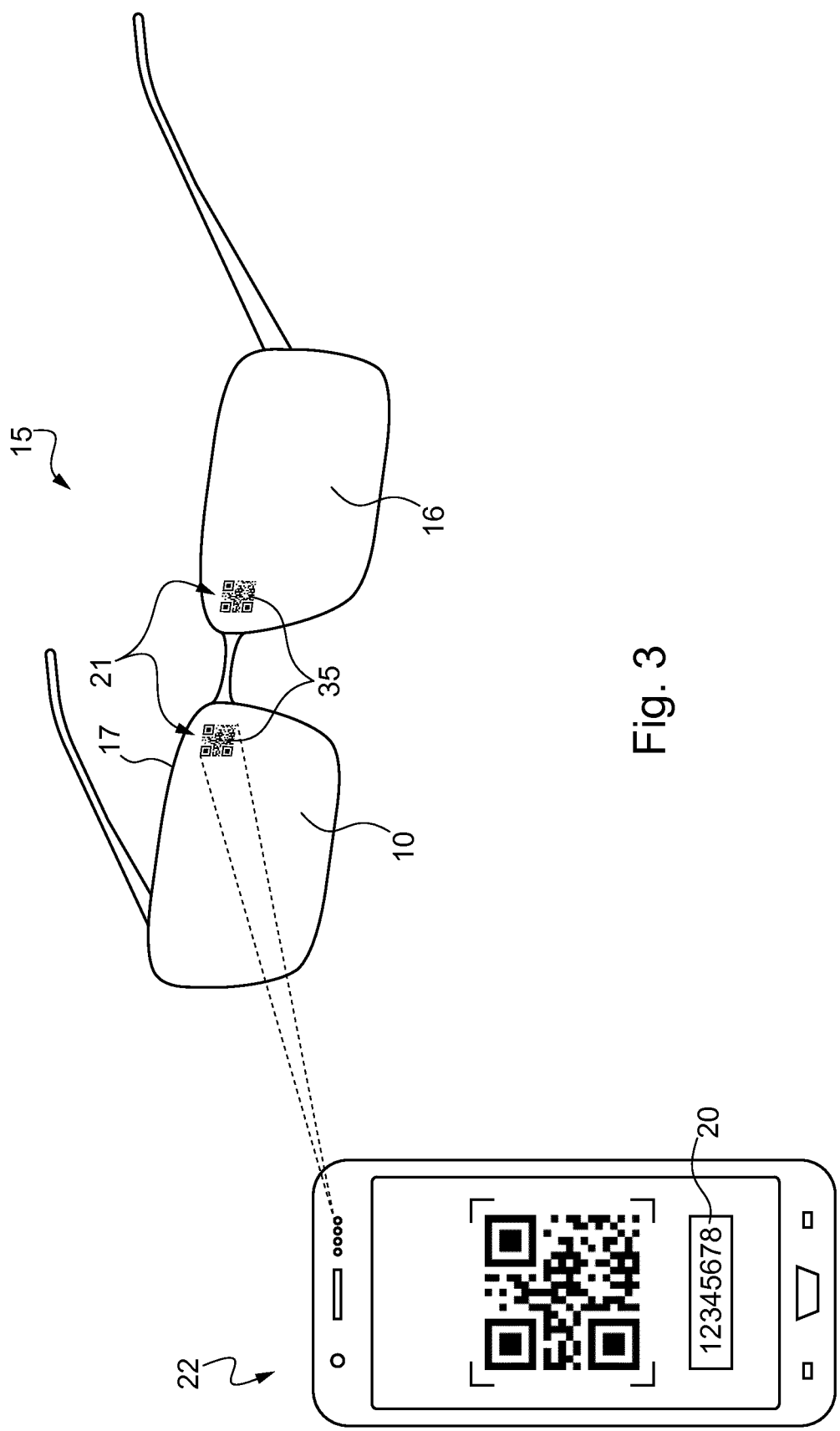
FIG. 3 is a schematic representation of a pair of spectacles and a smartphone with which the method according to the invention can be carried out.

In the embodiment shown on FIGS. 1 to 3, the support 21 is a reflective-transmissive pattern 35 formed on the front face of the spectacle lens 10, visible on the side of (in other words: visible facing) the front face.

The pattern 35 was formed when manufacturing the spectacle lens 10 in the form of a semi-finished lens, that is prior to portion 11.

The pattern 35 is formed by a plurality of dots, here square modules, having varying reflective-transmissive properties. Certain dots have the same reflective-transmissive properties as the rest of the surface of the front face of the spectacle lens 10. Other dots have predetermined reflective-transmissive properties that are different from the reflective-transmissive properties of the rest of the surface of the front face of the spectacle lens 10. The difference of reflective-transmissive properties is selected so that the dots having the predetermined different properties are visible on the side of the front face, that is by reflection.

According to the nature of the difference (more or less reflective than the rest of the surface), the dots having the predetermined difference are seen either as clear on a dark background (for example with a difference of reflection ranging from 1% or less on the rest of the surface to 5% or 8% or even 15% of reflection for the dots having predetermined different properties) or dark on a clear background (for example with a difference of reflection ranging from about 20% on the rest of the surface to 15% or even 8% of reflection, with a change of chroma and hue for the dots having predetermined different properties).

In those two cases, the difference in reflective properties are important, with a factor of 5 to 15 for the first case, typically clear lenses with an antireflective stack, or with a factor of at least 1.5 combined with a change of chroma and hue for the second case, typically on mirror lenses, which lead to a contrast between the two types of dots strong enough to be detected easily using a smartphone or any simple embedded camera facing the front face.

The difference in transmissive properties are comparatively much smaller; in the first case, the difference in transmitted light accounts for less than a factor of 0.15: 83% or 93% or 90% of light transmission in the dots with different properties vs 98% of transmission for the rest of the surface. In the second case, the difference in transmitted light accounts for a factor of less than 0.15: 85% or 90% of light transmission in the dots with different properties vs 80% of transmission for the rest of the surface.

Thus, using this technology, the pattern 35 has a high contrast in reflection, enabling it to be read easily when read from the front face, while having a low contrast in transmission, enabling it to be invisible or at least hardly visible and un-perturbing for the wearer of the spectacle glasses, when seen from the rear face.

In such a way, the pattern does not induce notable diffusion of light for the light reaching the wearer's eyes, eg in transmission, and it can thus be considered as transparent.

An exemplary method for measuring the impact of the pattern on diffusion is to measure the haze value in an area comprising the marking.

Haze value is measured by light transmission measurement using the Haze-Guard Plus© haze meter from BYK-Gardner (a color difference meter) according to the method of ASTM D1003-00, which is incorporated herein in its entirety by reference. All references to "haze" values in this application are by this standard. The instrument is first calibrated according to the manufacturer's instructions. Next, the sample is placed on the transmission light beam of the pre-calibrated meter and the haze value is recorded.

It is useful to know that for the specific haze-guard Plus© used by the inventors, the measuring spot used by the haze-guard Plus© is a spot having a diameter of about 16 mm. Comparatively, in the embodiments of the invention that were used for haze measurement, the pattern is a square with a side of about 1.9 mm. Accordingly, what is measured is the impact on haze of a 1.9*1.9 matrix in a $Pi(8)^2$ area. The ratio of the measured area with regard to the pattern is thus of about 55.

Further, a mean transmission value in the same area measured by the hazeguard Plus© has been done.

According to the measurement methodology explained above, the following experiment have been realised:

Lens 1 (Polycarbonate substrate with hard coat and anti-reflective (AR) coating):

Before engraving the pattern, the measured haze is of 0.17 and the transmission is of 97.9%.

After engraving a 1.9*1.9 mm pattern according to the invention, the measured haze is of 0.18 and the transmission 97.9%

Lens 2 (Polycarbonate substrate with hard coat and anti-reflective coating):

Before engraving the pattern, the measured haze is of 0.32 and the transmission is of 96.8%.

After engraving a 1.9*1.9 mm pattern according to the invention, the measured haze is of 0.32 and the transmission 96.8%

Lens 3 (Poly-thio Urethane substrate of index 1.6 with hard-coat and antireflective coating) engraved with a support which is not according to the invention:

Before engraving the pattern, the measured haze is of 0.23 and the transmission is of 97.5%.

After engraving a 1.9*1.9 mm pattern using a laser engraving which locally removes all the AR material and removes part of the hard coat, the measured haze is of 0.89 and the transmission 96.9%

As can be understood, the engraved lens 3 is not according to the invention as the impact of this specific support induces too much haze.

In particular, the term transparent, according to the invention means that the impact of the support on haze, measure in an area greater than the support by a factor of 55, is smaller than 0.1, preferably smaller than 0.05, and most preferably smaller than 0.02.

The person skilled in the art, knowing the experimental measurements above, can easily deduce, using a limited amount of experiments, an understanding of the word "transparent" according to the invention, even when measuring haze values with area ratio between the measured area and the support area widely different than the one presented above, for example, when measuring the haze of the support only, or when using a haze measurement with a measuring spot of 4 mm in diameter and measuring a 2*2 mm or 3*3 mm pattern.

This property of not disturbing the wearer can be further enhanced by positioning the pattern in a zone of the lens not often used by the wearer, such as the top temporal corner of each eyeglass.

Such large differences of reflective properties, from a factor 1.5 to a factor 15, and low differences in transmissive properties, are selected so that the pattern 35 is not visible or hardly visible on the side of the rear face, that is by transmission. The wearer of the pair of spectacles 15 is thus not disturbed by the pattern 35.

The pattern 35 can be incorporated into the spectacle lens 10 for instance by forming the dots having the different reflective-transmissive properties by locally modifying an interferential multicoat stack, that is by removing certain layers of the stack.

For instance, the spectacle glass 10 includes a substrate covered by such an interferential multicoat stack covering the substrate on the front face. The multicoat stack includes successively, from the substrate to front face, the following layers:

| Number of the layer as from the substrate | Material of the layer | Optical indicia of the layer | Thickness of the layer (±3 nm) |
|---|---|---|---|
| 1 | $SiO_2$ | 1,4658 | 150 nm |
| 2 | $ZrO_2$ | 2,0038 | 20 nm |
| 3 | $SiO_2$ | 1,4741 | 20 nm |
| 4 | $ZrO_2$ | 2,0038 | 100 nm |
| 5 | $SnO_2$ | 1,8432 | 6 nm |
| 6 | $SiO_2$ | 1,4741 | 75 nm |

The coating formed by this multicoat stack creates an interferential effect having a reflection coefficient less than 1%, for instance 0.7 to 0.8%.

The pattern 35 is formed by a plurality of punctual gaps of at least one layer of this interferential coating. Here the punctual gaps result from local irradiation by a laser beam ablating the top layer (number 6) and stopped or almost stopped by the layer below (number 5) which has absorbing properties at the wavelength of the laser beam.

The punctual gaps resulting from the ablation of the top layer (number 6) have a reflection coefficient close to 10%, more precisely between 9.5 and 10.5%.

The pattern 35 of this example thus appears to an observer facing the front face of the spectacle glass as clear on a dark background.

Further details on a method of making a mark that can be used to make the pattern 35 can be found in French patent application 1656851.

In the drawn embodiment, the pattern 35 forms a two-dimensional barcode comprising a plurality of modules in a juxtaposed matrix arrangement.

The plurality of modules includes, for encoding the identifier 20 according to a binary language, modules of a first type each formed by a dot having the different reflective-transmissive properties, and modules of a second type having the same reflective-transmissive properties as the rest of the front surface. Each dot or module of the first type is formed by a plurality of punctual gaps.

For instance, each dot or module of the first type is formed as a matrix having seven lines and seven columns of overlapping punctual gaps.

Generally speaking, a two-dimensional barcode including 21×21 modules can encode up to 25 alphanumerical characters. Each module has a square form having a side length of about 90 µm. The pattern 35 thus forms a square having a side length of about 90 µm×21=1.89 mm.

The step of reading the support 21 with the smartphone 22 for retrieving the identifier 20 is carried out by taking a photograph or video of pattern 35. The photograph or video is then analyzed for retrieving the identifier 20.

The analysis of the photograph or video is performed directly that is by the smartphone 22, as shown on FIG. 2, thanks to a dedicated application.

Alternatively, the analysis of the photograph or video is performed elsewhere, for instance by having an image analysis program on a local computer analyzing the photograph or video, or having the photograph or video sent to a server for analyzing.

Turning back to the application on the smartphone 22, it enables the smartphone to automatically connect to the computer system 23 when the identifier 20 is retrieved. The application also enables the smartphone 22 to be a user interface for the exchanges with the computer system 23 such as with the interactive managing routine of the entry point 24 and with the data base manager 26.

Here, the computer system 23 is accessible through the Internet.

The entry point 24 is configured such that after having carried out the interactive managing routine which updates if needed the current value of the monitoring variable 28, it hands over to the navigation manager 27 in certain circumstances.

The navigation manager 27 then redirects according to the circumstances to websites 36. The application in the smartphone 22 hands over in turn to a web browser in the smartphone.

The data base manager 25 may also hand over to the navigation manager 27 in certain circumstances.

FIG. 3 shows the smartphone 22 taking a photograph or video of the pattern 35 of the spectacle lens 10 in the pair of spectacles 15. The application in the smartphone 22 is able to take a picture or a video of also the pattern 35 of the other spectacle lens 16, to retrieve the identifier included in this pattern and to interact in a same session with the computer system 23 for both identifiers, both for the spectacle lens 10 and the spectacle lens 16.

Figure 4:
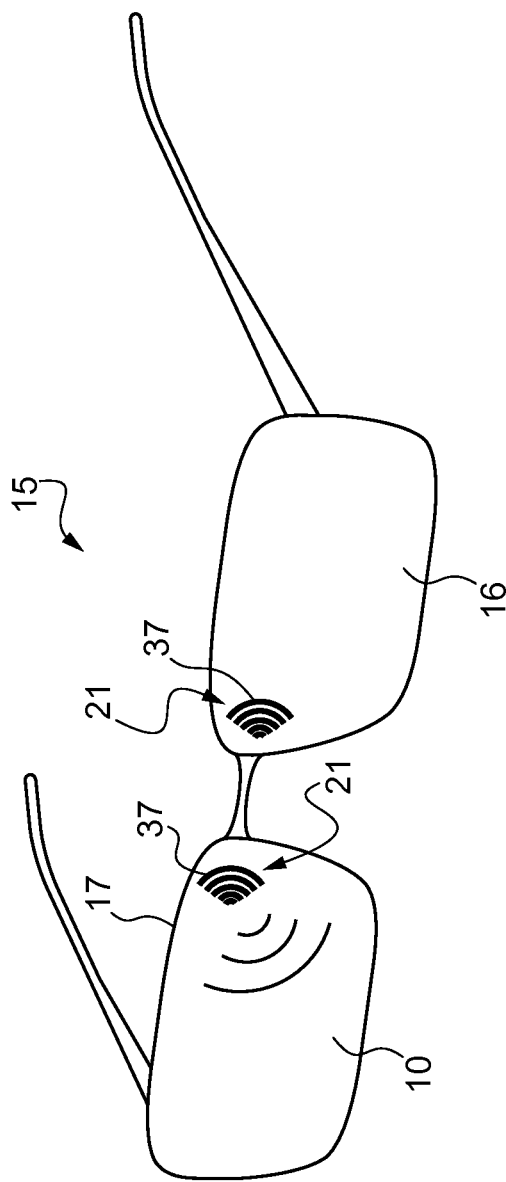
FIG. 4 is a schematic representation similar to FIG. 3 but with a different support of the unique identifier of the spectacle lenses of the pair of spectacles.
Figure 4:
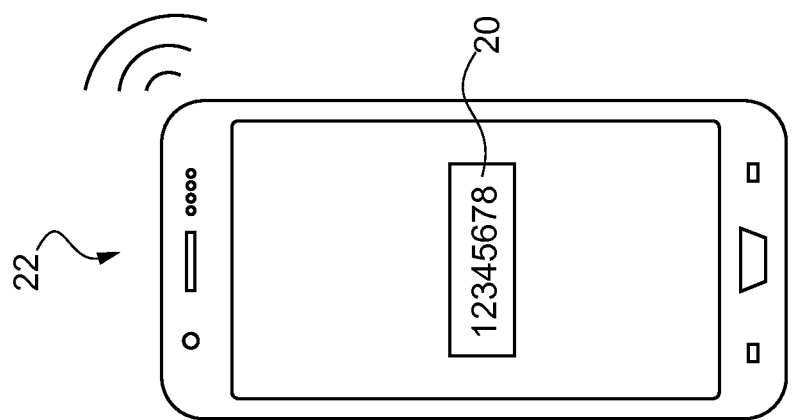

In the variant shown on FIG. 4, the pattern 35 is replaced by a RFID device 37, that is the support 21 is the RFID device 37.

Of course, it is desirable that the RFID device is selected as transparent so that the wearer of the pair of spectacles 15 is not disturbed by the RFID device 37.

The reading and retrieving of the identifier 20 is similar as for the pattern 35, except that a RF reader, such as one using a NFC protocol, is used instead of taking a photograph or video and analyzing it.

The application in the smartphone 22 is configured accordingly.

It should be noted that it is very convenient to use a consumer device such as the smartphone 22 for retrieving the identifier 20 and interacting with the computer system 23.

It is of course possible to use different devices for retrieving the unique identifier 20 and for interacting with the computer system 23. For instance, a photograph can be taken with a camera and sent to a personal computer having an image analysis program for retrieving the identifier 20, and then to use a browser for accessing the computer system 23.

In not drawn variants:
- the predetermined portions of the lifetime of the spectacle lens include more than one mounted-in-a-frame portion, for instance one portion before delivery to the owner, one portion from delivery to the first servicing step carried out by an optician, and other portions each starting at the end of a servicing step;
- the predetermined portions of the lifetime of the spectacle lens include more than one mounted-in-a-frame portion and do not include any not-yet-mounted-in-a-frame portion;
- the monitoring of a spectacle lens such as 10 or 16 is conducted during one or more portion(s) of its lifetime which is (are) not predetermined;
- the external tool for reading the support 21 is different from a smartphone but still a consumer product configured to be connected to an external network such as Internet, for instance a touchpad, a tablet computer, a personal digital assistant (PDA) or the like, configured to connect directly or indirectly to the Internet by use of wireless communication means;
- the computer system or distant server 23 is different, for instance without entry point such as 24 and/or having a database arranged differently than with sections such as 30 to 33, while still being able to be contacted using an identifier such as 20 and to enable to gather data related to the spectacle lens corresponding to this identifier;
- the distant computer system or server 23 is different, for instance without entry point such as 24 and/or having a database arranged differently than with sections such as 30 to 33, while still being able, upon receiving from a requester a request including at least part of an identifier such as 20, to access the data base, to retrieve certain data related to the spectacle lens corresponding to this identifier and to send the retrieved data to the requester; and/or
- the support 21 is different from a pattern such as 35 or a RFID device such as 37, but still a transparent support in which is coded an identifier such as 20 readable by an external reading tool for retrieving the identifier.

Numerous other variants are possible according to the circumstances and it is reminded in this respect that the invention is not limited to the described and drawn embodiments.

The invention claimed is:

1. A method for monitoring a spectacle lens, comprising:
   a) selecting said spectacle lens as including a transparent support in which is coded an identifier readable by an external reading tool for retrieving said identifier;
   b) reading said support using the external reading tool and retrieving said identifier;
   c) contacting a distant server using the identifier; and
   d) gathering from the distant server data related to the spectacle lens.

2. The method according to claim 1, wherein the spectacle lens is already in a form of a trimmed lens having a contour in accordance with a shape of a frame in which the spectacle lens is to be mounted and wherein the support is incorporated in a location of the spectacle lens selected to still belong to the trimmed lens.

3. The method according to claim 1, wherein the monitoring is performed at predetermined portions of a lifetime of said spectacle lens, including at least one mounted-in-frame portion in which the spectacle lens is mounted in a frame.

4. The method according to claim 1, wherein said support is a reflective-transmissive pattern formed on a font face of the spectacle lens, visible on a side of the front face.

5. The method according to claim 1, wherein said support is a reflective-transmissive pattern formed on a font face of the spectacle lens, visible on a side of the front face; and wherein said step of reading said support with said external reading tool for retrieving said identifier is carried out by taking a photograph or video of said pattern and by analyzing said photograph or video or having it analyzed or sent to a server for analyzing.

6. The method according to claim 1, wherein said support is a RFID device.

7. The method according to claim 1, wherein said support is a RFID device; and wherein said step of reading said support with said external reading tool for retrieving said identifier is carried out by receiving said identifier from said RFID device through a RF reader, such as one using a NEC protocol.

8. The method according to claim 1, wherein in said step of reading said support with a reading tool for retrieving said identifier, said reading tool is a consumer product configured to be connected to an external network including Internet.

9. The method according to claim 8, wherein in the consumer product is a portable or mobile device, including smartphone, touchpad or tablet computer, PDA or the like, configured to connect directly or indirectly to the Internet by use of wireless communication means.

10. A method for monitoring a spectacle lens, comprising:
a) allocating to said spectacle lens an identifier that is unique to said spectacle lens;
b) incorporating into said spectacle lens a transparent support in which is coded said identifier so that said support is readable by an external reading tool for retrieving said identifier;
c) providing data related to said spectacle lens to a predetermined database, before or after step b);
d) upon receiving a request issued from a requester, accessing the database and retrieving at least some of said data, the request including at least part of the identifier;
e) sending the retrieved data to the requester; and
f) optionally, either before step b) or after step e), receiving new data related to said spectacle lens and adding said data into the database.

11. The method according to claim 10, wherein said received request issued from a requester includes a variable related to a nature of the requester, and the data sent back toward the requester depends both on the identifier and on the nature of the requester.

12. The method according to claim 10, wherein the monitoring is performed at predetermined portions of a lifetime of said spectacle lens, including at least one mounted-in-a-frame portion in which the spectacle lens is mounted in a frame; and wherein said step of accessing the database is performed using a computer system which includes an entry point, said entry point including a monitoring variable interactive managing routine for updating a monitoring variable having a current value representative of a current one of said portions of the lifetime of said spectacle lens, and said step of accessing the database includes accessing said entry point and carrying out said monitoring variable interactive managing routine.

13. The method according to claim 12, wherein said computer system includes for at least one not-yet-mounted-in-a-frame portion a database section that contains data representative of physical parameters in relation to manufacturing of said spectacle lens.

14. The method according to claim 12, wherein the monitoring is performed at predetermined portions of a lifetime of said spectacle lens, including at least one mounted-in-a-frame portion in which the spectacle lens is mounted in a frame; and wherein said computer system includes for said at least one mounted-in-a-frame portion a database section that contains data representative of optical properties of said spectacle lens.

15. The method according to claim 14, wherein said optical properties include at least one of a spherical power and a cylindrical power.

16. The method according to claim 14, wherein said database section that contains data representative of optical properties of said spectacle lens also contains data representative of physical parameters in relation to servicing of said spectacle lens.

17. The method according to claim 14, wherein said database section that contains data representative of optical properties of said spectacle lens also contains information representative of optical properties of a pair of spectacles in which is mounted said spectacle lens.

18. The method according to claim 14, wherein said database section that contains data representative of optical properties of said spectacle lens also contains data representative of optical properties of the other spectacle lens in a pair of spectacles in which is mounted said spectacle lens.

* * * * *